(12) United States Patent
Strijker

(10) Patent No.: US 7,151,679 B2
(45) Date of Patent: Dec. 19, 2006

(54) ADAPTIVE LEADING EDGE BLANKING CIRCUIT

(75) Inventor: Joan Wichard Strijker, Nijmegen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/527,865

(22) PCT Filed: Sep. 5, 2003

(86) PCT No.: PCT/IB03/03909

§ 371 (c)(1),
(2), (4) Date: Mar. 16, 2005

(87) PCT Pub. No.: WO2004/027962

PCT Pub. Date: Apr. 1, 2004

(65) Prior Publication Data
US 2005/0270807 A1 Dec. 8, 2005

(30) Foreign Application Priority Data
Sep. 20, 2002 (EP) .................. 02078903

(51) Int. Cl.
H02M 3/335 (2006.01)
(52) U.S. Cl. ...................................... 363/21.01; 363/20
(58) Field of Classification Search ............ 363/21.01, 363/20, 16
See application file for complete search history.

(56) References Cited

U.S. PATENT DOCUMENTS 6,144,245 A    11/2000   Balogh
6,219,262 B1   4/2001    Burgyan Primary Examiner—Karl Easthom
Assistant Examiner—Richard V. Muralidar
(74) Attorney, Agent, or Firm—Peter Zawilski

(57) ABSTRACT

An adaptive leading edge blanking circuit in which the leading edge blanking time is reduced at low to very low power levels of an SMPS, but is substantially constant at medium to high power levels. Adapted leading edge blanking time maybe provided by modifying a conventional leading edge blanking timer in which a fixed voltage reference source is replaced with a variable voltage reference source, the variable voltage reference being dependent upon power requirements on a secondary side of the SMPS.

15 Claims, 8 Drawing Sheets

ADAPTIVE LEADING EDGE BLANKING CIRCUIT

The present invention relates to an adaptive leading edge blanking circuit and method suitable for, but not limited to, use within switched mode power supplies (SMPS).

It is a critical feature of switched mode power supply arrangements to provide current monitoring of a switching transistor by means of a current sense signal. The current sense signal is utilised in the SMPS to provide appropriate current mode control for the power supply load and is used on a cycle by cycle basis. When the switching transistor turns on, a current peak will occur during the turn-on transition, this current peak being caused by inherent or stray capacitances within the control circuitry. This current peak, if not filtered out, would cause the control circuit to attempt to switch off the power transistor, due to the excessive detected current. In fact, as the current peak is a mere transient, and is an inherent feature of the switching circuit, it is imperative that the control circuit should effectively ignore it. The time during which such transient switching peaks are ignored, is known as the Leading Edge Blanking (or LEB) time and circuits for achieving such blanking are well known in the art.

In the simplest type of leading edge blanking circuit a timer, such as a one-shot timer, is utilised so as to ignore current peaks during a preset time period following an initial turn-on point of the switching transistor.

FIG. 1 shows a basic current mode control flyback converter circuit. The circuit comprises a switching transistor S1 10, having a drain terminal connected to one end of a primary winding P of a transformer 20, a source terminal connected to a first end of a sense resistor $R_S$ 30 and a gate connection arranged to receive a switching input from a first control output 100A of a switch controller 100. The sense resistor $R_S$ 30 has a second end commonly connected to a ground voltage and to a first sense input 100B of switch controller 100. Further, the first end of sense resistor $R_S$ 30 is connected to a second sense input 100C of the switch controller 100.

Transformer 20 forms an inductive load of the switching transistor S1 10. A secondary winding S of the transformer 20 is regulated by diode $D_R$ and capacitor $C_R$ to provide an output voltage $V_{OUT}$. Circuitry elements on the primary side of transformer 20 are provided with input voltage $V_{IN}$.

The switch controller 100 comprises a power control 110 which sets a trip level of a current reference source $I_{TRIP}$ 120, whose output forms a first input to a current comparator 130, the second input of comparator 130 being connected to the second sense input 100C. Comparator 130 has its output connected to a first input of logic gate 140. There is further provided an LEB timer 150 which provides an output "Blank". The time constant of LEB timer 150 is determined by an external capacitor $C_{TC}$. There is further provided an oscillator 160 and a latch 170. Latch 170 is a set-reset type latch having its set input arranged to receive an output of the oscillator 160, and its reset input arranged to receive an output of logic circuit 140 and an output "Q" being arranged to provide a switching signal to the gate of switching transistor S1 10, via first control output 100A. The output of latch 170 is further fed back to a trigger input of the LEB timer 150. As mentioned already, the LEB timer 150 has its time set according to the time constant set by timing capacitor $C_{TC}$ and, for a given blanking period it provides a blanking signal to a second input of the logic circuit 140.

Logic circuit 140 is here shown as an AND function gate having a first input from comparator C 130 and a second input being an inverted output of the LEB timer 150. In other words, when "Blank" is high the second input to the AND gate is low and when "Blank" is low the second input is high.

Operation of the prior art circuit of FIG. 1 will now be considered. It will be assumed that at the start point of operation of the FIG. 1 circuit, the switching transistor S1 10 is off, and is about to be turned on by the oscillator 160 issuing a positive signal to the set input of latch 170 so as to set the Q output of latch 170 high.

At the point at which the Q output of latch 170 goes high, two things happen. Firstly, a positive signal is provided to the gate of switching transistor S1 10 via first control output 100A to initiate turn on of that transistor. Secondly, this same signal is used to trigger the LEB timer 150 to initiate a blanking period.

Referring to FIG. 2, the point at which the Q output of latch 170 goes high is illustrated as being time period $t_0$. Four wave forms are shown in FIG. 2, a first trace represents the voltage $U_{SENSE}$ across sense resistor $R_S$ 30, which in turn represents the source current. The second trace shown in FIG. 2 represents the drain voltage $V_d$ measured between the drain of switching transistor S1 10 and ground potential, the third trace represents a voltage which is generated internally of the LEB timer 150 and the fourth trace shows the output "Blank" of LEB timer 150.

At time point $t_0$ when Q first goes high, switching transistor S1 10 commences its turn-on period. During switch on of the transistor S1 10, a peak occurs in the source current (which in turn causes $U_{SENSE}$ to peak) by virtue of capacitance $C_D$ of the drain of the switch S1. The capacitance $C_D$ can be a real capacitor, the stray capacitance of the node or a combination of both. As can be seen from the first trace, this peak is a transient which rises to a high level and then falls away. The transient rises to a sufficient level such that it would normally cause the switch controller 100 to detect a trip (excessive current) and to switch off. However, switch controller 100 is prevented from switching off at this time, as between the initial turn on period $t_0$ and a subsequent period $t_1$ the output "Blank" of LEB timer 150 is set in a high condition and the logic circuit 140 is set such that whenever the "Blank" is high, a reset instruction cannot be passed to the latch 170.

Referring to the third and fourth traces of FIG. 2, it can be seen that the LEB timer 150 is arranged such that the "Blank" signal will be maintained high until the internal voltage of the LEB timer 150 has risen to a threshold voltage shown in the third trace as being "timer level". Once that threshold voltage has been attained, the output "Blank" of the LEB timer 150 is arranged to go low. The internal voltage of LEB timer 150 reaches "timer level" at time period $t_1$, determined by means of the time constant of the LEB timer 150 as set by capacitor $C_{TC}$.

The time constant of LEB timer 150 in this prior art circuit is set rather conservatively, as it is desired that blanking should normally occur for at least the duration of the transient peak in source current. In order to ensure that this condition is met, and because of tolerances within the various different circuitry components, inevitably the blanking period is set longer than it need be. For instance, it can be seen from the first and second traces of FIG. 2 that the transient peak has actually dropped below the "Trip level" and disappeared long before time period $t_1$ and that the drain voltage $V_d$ has approached ground potential also (indicating a fully-on condition of transistor switch S1 10).

For normal operation, the LEB time does not affect the performance of the supply as the on-time ($t_0$–$t_2$) is longer than the LEB time. As soon as the current trip level is crossed at time point $t_2$ (well after the LEB time) the transistor switch S1 10 is turned off. Turn-off here occurs under normal operation by virtue of the source current having reached the "trip level" as set by power control 110 according to the required duty cycle of the transistor switch S1 10. When "trip level" is reached the output of comparator C 130 goes high which then causes the output of logic circuit 140 to go high and reset latch 170, turning off S1. It will be appreciated that the principal function of the LEB timer 150 is to prevent a high output of the current comparator C 130 from being able to initiate a turn-off of the transistor switch S1 10 during the blanking period such that "false" current information is blanked. As, during the LEB time, the transistor switch S1 10 cannot be switched off by the current comparator C 130 this sets a minimum on-time ($t_0$–$t_1$) of the switch. As the switch is on for a certain time, the power supply is always converting some power. If there is no load on the output of the power supply, the converted energy has to be dissipated, for example by a pre-load on the output. For minimum no-load power (stand-by power) a pre-load is obviously undesirable.

Low power operation of the circuit shown in FIG. 1, will now be considered by regarding the various traces shown in FIG. 3. In FIG. 3, the same four variables are shown as in the FIG. 2 traces. Namely, the first trace shows sense current $U_{SENSE}$, the second trace shows drain voltage $V_d$, the third trace shows the internal voltage of the LEB timer 150, and the fourth trace shows the blanking output "Blank" of LEB timer 150. It will be appreciated that the horizontal scale in FIG. 3 has been exaggerated slightly with regard to the FIG. 2 illustration as it is important to show in more detail the time period $t_0$, $t_1$.

When the output Q of latch 170 goes high, switch on of transistor switch S1 10 commences and the internal control voltage of LEB timer 150 commences its rise towards the timer level shown in the third trace. During the period in which the LEB timer internal voltage rises towards the "timer level" switching transistor S1 10 is prevented from turning off so that the transient peak current shown in the first trace is ignored.

If it is desired to operate at a very low power level, then the "trip level" set by power control 110 to achieve such low power operation might be of a magnitude which is rather lower than the maximum possible operating power designated by $U_{SENSE\ MAX}$ in the first trace. When the trip level is set so low, it is evident that a desired turn off point of the switching transistor S1 can sometimes be very short and may be less than the blanking period ($t_0$–$t_1$) as determined by the time constant of the LEB timer as manifested by the timer level of the third trace.

Referring in detail to the traces of FIG. 3, it can be seen that in the situation shown, a particular desired low power operation is simply not achievable, as it is inhibited by the fixed blanking period set by LEB timer 150. This fixed period ensures that although the sense current does reach the "trip level" in a legitimate manner (i.e. after the transient peak), the actual time point $t_2$ at which the switching transistor S1 10 is turned off, cannot be made less than the blanking period $t_1$. This minimal on time $t_1$ results in an output power which is larger than required and this excessive output power needs to be dissipated, resulting in a lower efficiency. If the excessive power is not taken care of, the power supply will go out of regulation. In the circuit of FIG. 1, this would lead to a higher output voltage or a higher output current than was intended.

To summarise the above, it can be seen that the conventional LEB timer 150 designates a fixed blanking period. This fixed blanking period causes problems when it is desired to reduce the on-time of a switching transistor to a level which is within the blanking period.

Suggestions have been made in the prior art for making the LEB time adaptive. In both U.S. Pat. No. 6,144,245 and U.S. Pat. No. 6,219,262 (respectively in the names of Unitrode Corporation and Semtech Corporation) an LEB timer is not used and, instead, the gate current of the switching transistor is sensed so as to gauge the point at which the transient switching pulse can be disregarded and to limit the blanking period to that time. In these arrangements, it is known that as soon as the gate current has subsided the peak on the current through the main power switch has elapsed. Such arrangements generally work satisfactorily, although a problem occurs as soon as the threshold of the power switch approaches the supply voltage $V_{DD}/V_{CC}$. In that situation, gate current decreases due to the limitation in current drive of the driver at such a high output voltage and subsequently LEB blanking ceases to function correctly.

It is an object of the invention to provide an adaptive leading edge blanking circuit and method in which at least one of the abovementioned problems of the prior art is overcome or lessened to some extent.

According to a first aspect of the present invention, there is provided a leading edge blanking circuit comprising: an input terminal for receiving a trigger signal indicating a time at which a blanking period should commence; switching means arranged to be activated by the trigger signal to change from a first state to a second state; comparison means having a first input terminal being connected to a reference source, a second input terminal arranged to receive a voltage which ramps over time in response to the trigger signal and an output terminal for providing an output signal of the leading edge blanking circuit which changes state subsequent to the voltage at the second terminal of the comparison means reaching the voltage level supplied by the reference source to the first terminal; and a charging circuit for providing the ramp voltage to the second input terminal of the comparison means, the circuit being characterised in that the time taken for the ramp voltage to reach the voltage level supplied by the reference source is variable and dependent upon a control signal ("timer level") received at a control input of the circuit.

In first embodiments of the leading edge blanking circuit the reference voltage supplied to the first terminal of the comparison means comprises the control signal supplied by the power controller.

The charging circuit may comprise a current source and a capacitor, the current source being arranged to charge the capacitor following an initiation of change in state of the switching means from the first state to the second state and, wherein, the voltage supplied to the second input terminal of the comparison means is arranged to ramp in accordance with a charged state of the capacitor.

Preferably, the switching means comprises a transistor switch, the charging circuit comprises a capacitor connected in parallel with the transistor switch and a current source arranged to charge the capacitor when the transistor switch is not in the first state; and the comparison means comprises a comparator, wherein the first terminal is a non-inverting input and the second terminal is an inverting input, the first terminal being connected to the control signal and the second terminal being connected to a terminal of the charging circuit at a point between the current source and the capacitor.

In second embodiments of the leading edge blanking circuit the reference voltage supplied to the first terminal of the comparison means may be a fixed voltage reference source and, wherein, the control signal is arranged to vary a current level in the charging circuit, to change the rate at which the voltage at the second input terminal of the comparison means ramps over time.

Preferably, the charging circuit comprises a voltage source, a transistor and a capacitor, the transistor being responsive to the voltage source and the control signal to turn on and to supply a charging current to the capacitor.

Preferably, the charging current to the capacitor provides a variable current, dependent upon a potential difference between the voltage source and the control signal.

Preferably, the first switching means comprises a transistor switch; the comparison means comprises a comparator in which the first terminal comprises a non-inverting terminal connected to a fixed voltage reference source, and the second input terminal comprises an inverting input; and the charging circuit comprises a capacitor, transistor and a voltage source, the capacitor being connected in parallel with the first switching means and having one terminal thereof connected in common to the inverting input of the comparator and an output terminal of the transistor, the transistor being arranged to supply a variable current from the voltage source dependent upon a voltage level of the "timer level" signal supplied to a control terminal thereof.

In another aspect there is provided a power controller for a switched mode power supply (SMPS) for supplying a control signal ("timer level") to the leading edge blanking circuit of the first aspect, the power controller being arranged to output the control signal at a substantially constant level during a first operating power range of the SMPS and, in a second operating power range, to progressively decrease the level of the control signal as the output power requirements of the SMPS decrease.

Preferably, the first operating power range comprises a normal operating power range of the SMPS being controlled, and the second range comprises a low power to very low power operating range.

The power controller preferably comprises an amplifier, a transistor, a supply voltage, a variable voltage source whose voltage depends upon the power output requirements of the SMPS, a voltage reference source, and a control output terminal for supplying the control signal "Timer Level". Preferably, the control output terminal is connected to the supply voltage via a first biasing means and to one terminal of the transistor, the voltage reference source is connected to a non-inverting input of the amplifier, an inverting input of the amplifier is connected via second biasing means to the variable voltage source and directly to another terminal of the transistor, and an output of the amplifier is arranged to operate and progressively increase a control current input to the transistor so as to progressively turn on the transistor during the second operating range and is further arranged to turn off the transistor during the first, normal, operating range, wherein when the transistor is turned off, the voltage of the Timer Level control signal is at a maximum constant value and, when the transistor is in a linearly operating state the voltage of the Timer Level control signal is arranged to decrease as the transistor progressively turns on.

The power controller may comprise an amplifier, a transistor, a supply voltage, a voltage reference source, a variable voltage source whose voltage level is dependent upon the output power requirements of the SMPS and first and second bias resistors, wherein: the voltage reference source is connected between a lower rail voltage and a non-inverting input of the amplifier, the power supply is connected between the lower rail voltage and a first terminal of the first bias resistor to provide an upper rail voltage thereto, the variable voltage source is connected between the lower rail voltage and a common connection between a first terminal of the second bias resistor and a first output terminal of the power controller to provide a power level control signal "Trip Level" to the said first output terminal, an inverting input of the amplifier is commonly connected to a second terminal of the second bias resistor and a third terminal of the transistor, an output terminal of the amplifier is connected to a first terminal of the transistor and wherein a second terminal of the transistor is connected in common to a second output terminal of the power controller and a second terminal of the first bias resistor and to provide the control signal "Timer Level" to the said second output terminal.

In another aspect of the invention, there is provided a switched mode power supply (SMPS) including a flyback converter comprising a power controller arranged to set a desired power output of the SMPS by generating a control signal "trip level" at which the SMPS is to revert from an on-power state to an off-power state, a switch controller for controlling a main switching component of the SMPS in accordance with the power requirements as set by the "trip level" signal and a leading edge blanking circuit for providing an output signal "blank" arranged to validate or inhibit resetting of the switch controller, wherein the leading edge blanking circuit comprises a leading edge blanking circuit according to the first aspect of the invention.

Preferably, the power controller is arranged to supply the "timer level" signal to the leading edge blanking circuit such that at "trip levels" above a particular threshold, the "timer level" is a substantially constant voltage regardless of the actual "trip level" and the "timer level" is arranged to decrease once the "trip level" decreases below the threshold level.

According to a further aspect of the invention, there is provided a method of controlling a leading edge blanking circuit of the type in which, conventionally, a leading edge blanking time is fixed, the method comprising, during a normal power operating range of a switch mode power supply (SMPS) of which the leading edge blanking circuit forms a part, providing a substantially constant reference voltage to a voltage controlled switch of the leading edge blanking circuit so as to maintain the leading edge blanking period to be of a constant time period and, the method being characterised in that in a low to very low operating power range of the SMPS, a reduced level reference voltage is provided to the voltage controlled switch of the leading edge blanking circuit to adaptively reduce the leading edge blanking period.

For a better understanding of the invention, and to show how embodiments of the same may be carried into effect, reference will now be made, by way of example, to the accompanying diagrammatic drawings in which.

Figure 8A:
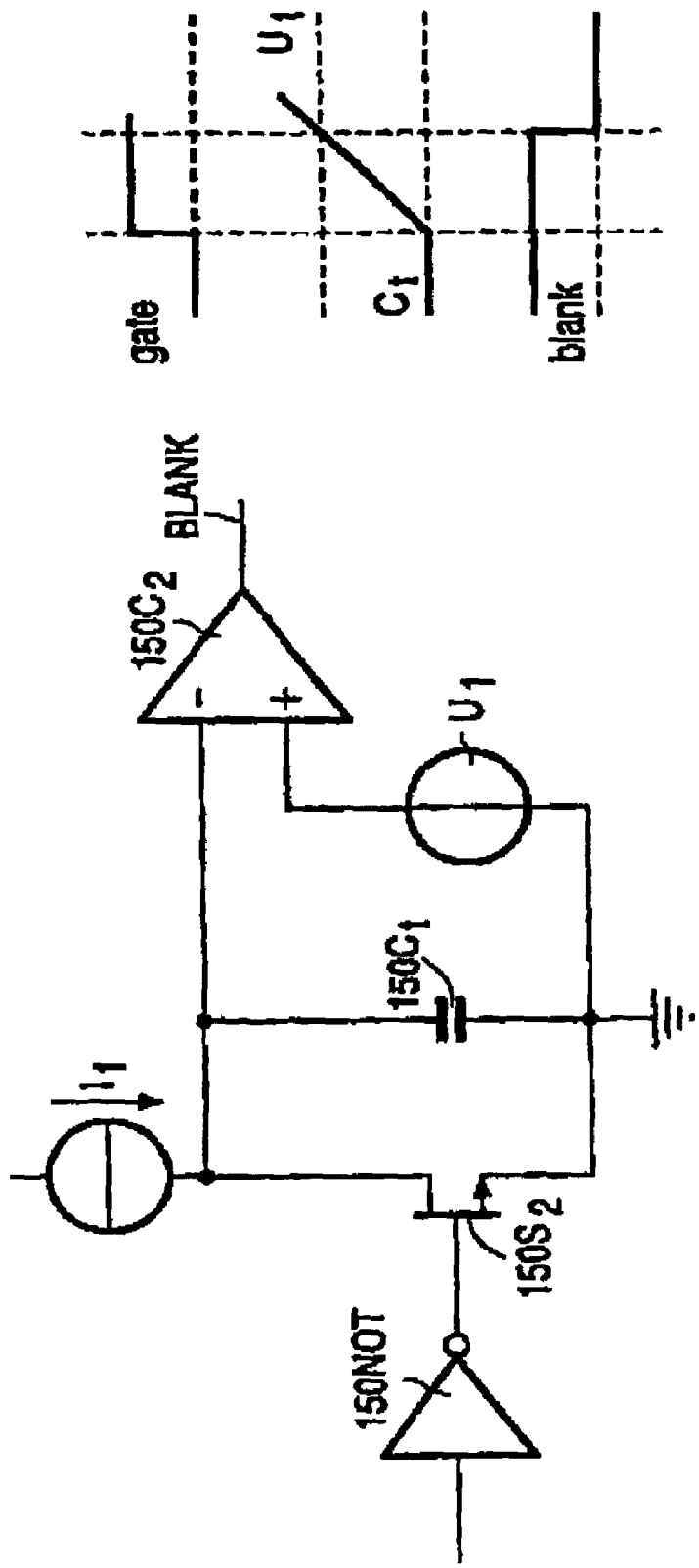
Figure 8B:
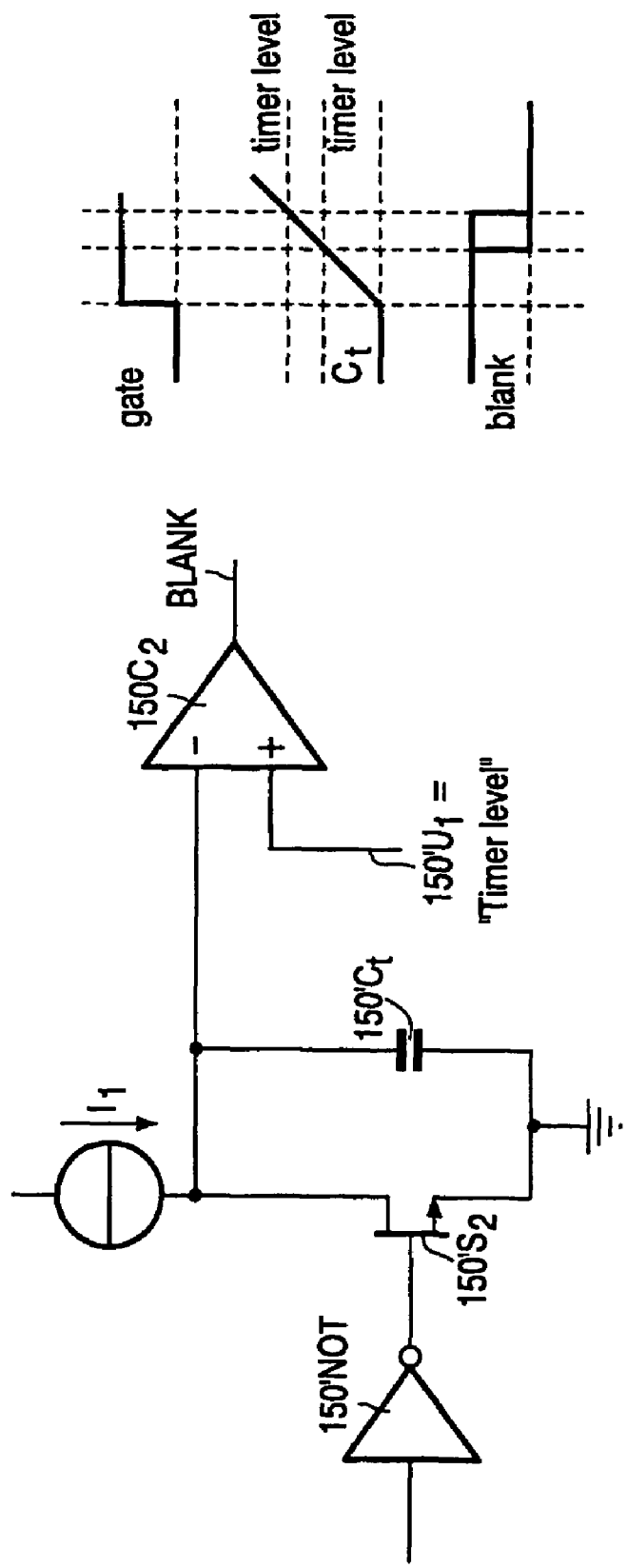
Figure 9:
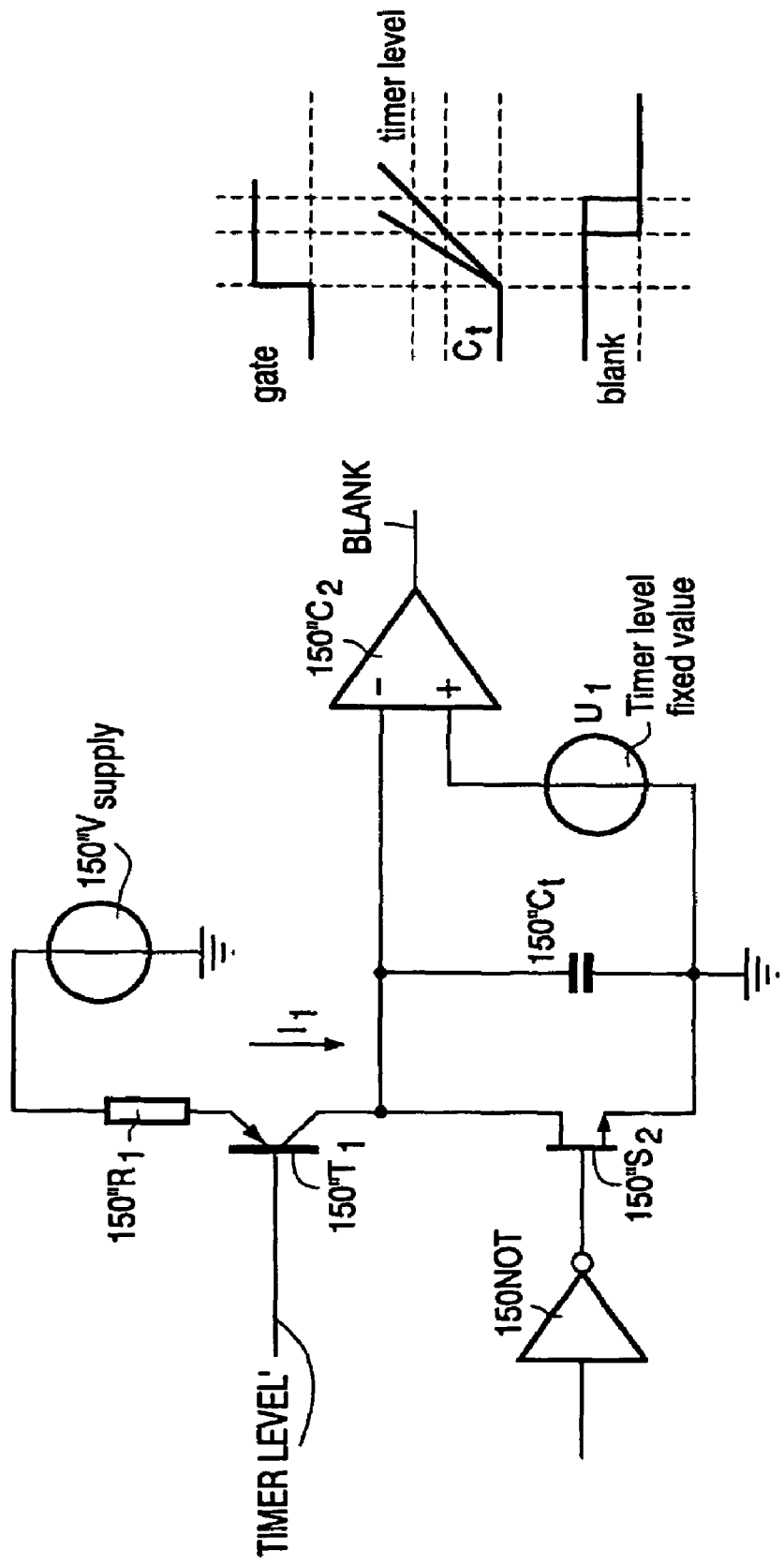

FIGS. 8A and 8B respectively show a prior art LEB timer and a modified LEB timer modified in accordance with an embodiment of the invention; and FIG. 9 shows an alternative embodiment of an LEB timer with a variable timer level.

Figure 1:
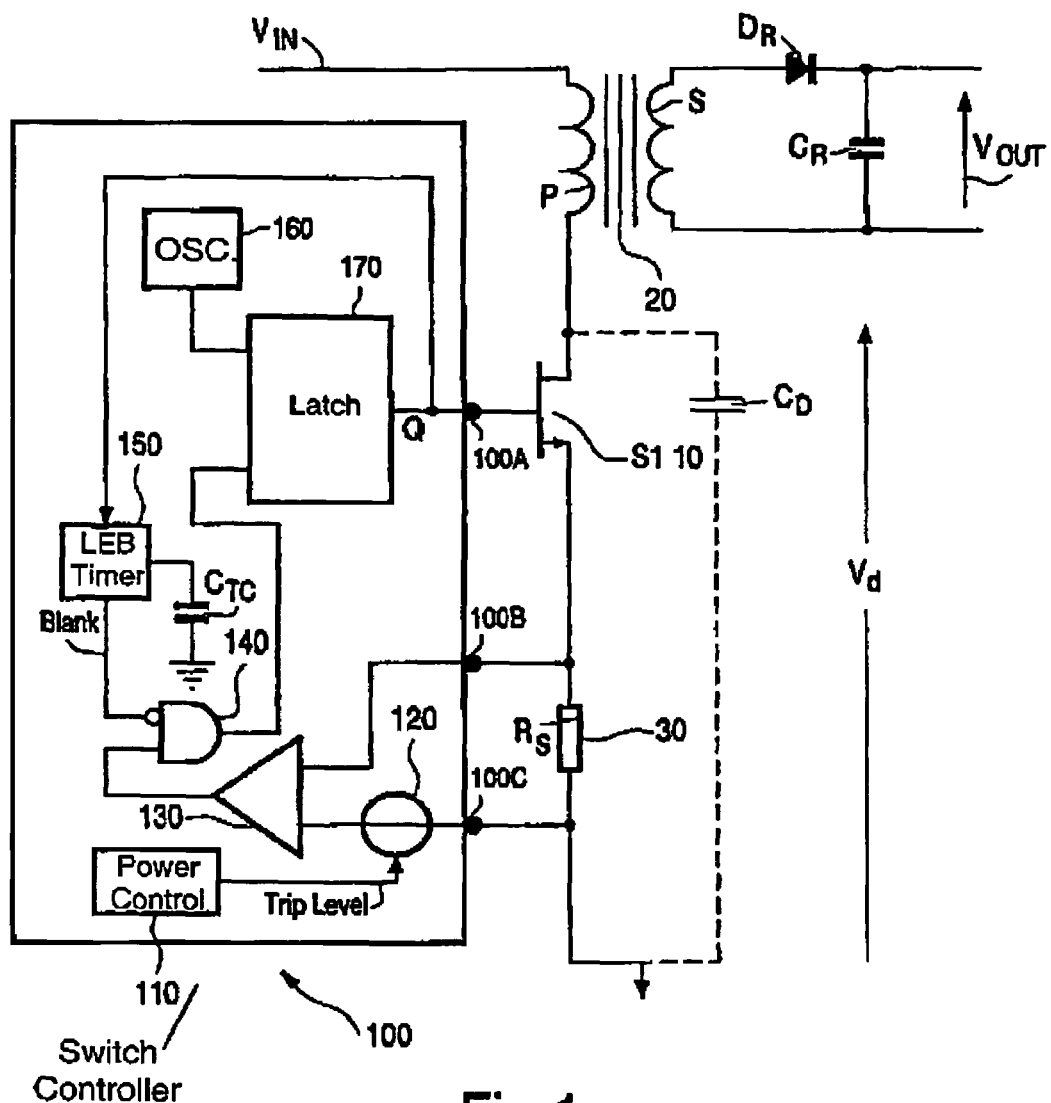
FIG. 1 illustrates a prior art circuit for a flyback converter incorporating a switch controller with an LEB timer.
Figure 2:
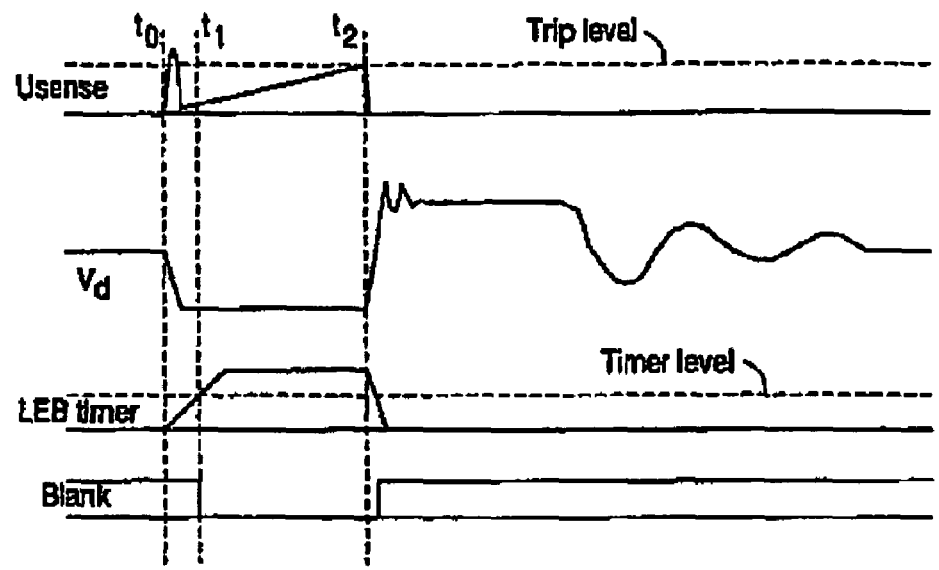
FIG. 2 shows timing diagrams for the flyback converter of FIG. 1 under a normal operating mode.
Figure 4:
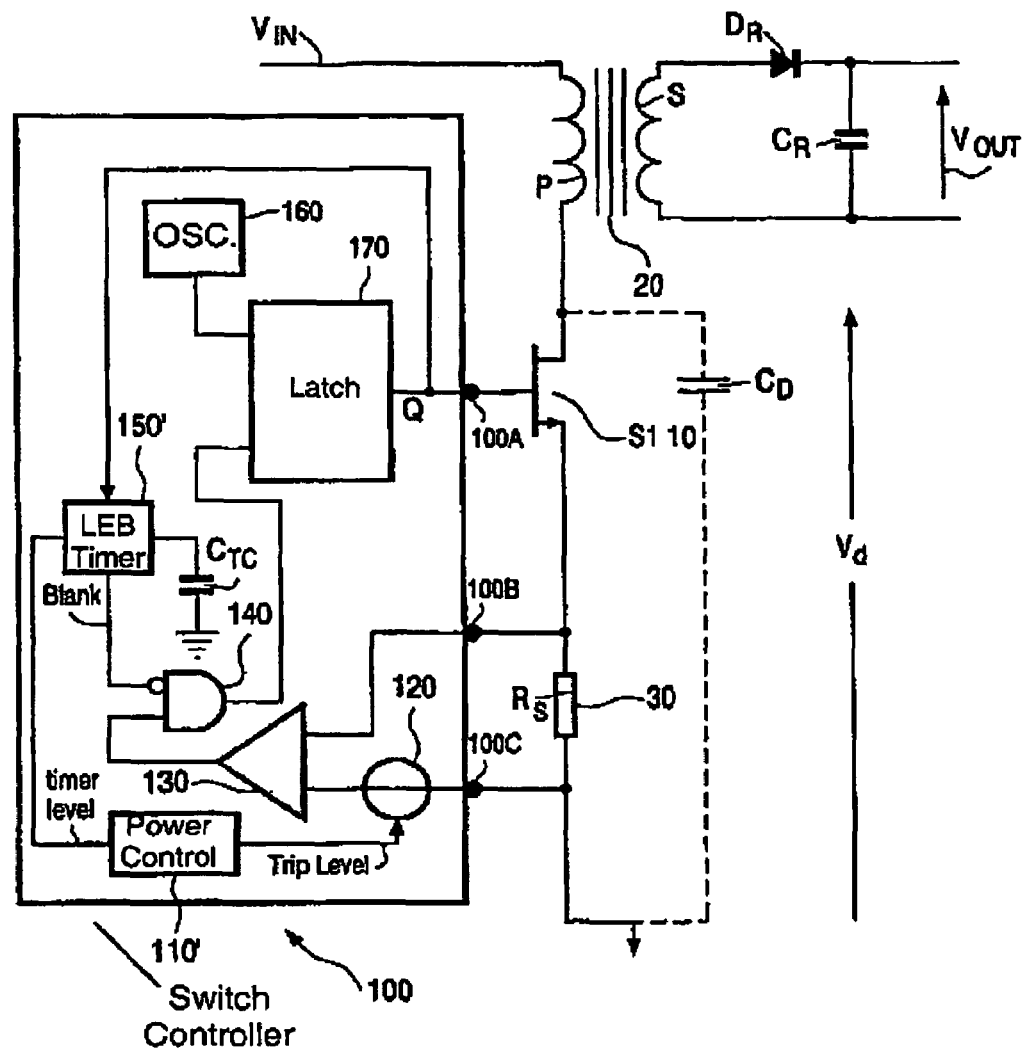
FIG. 4 is a circuit according to an embodiment of the invention incorporating an LEB timer with variable timer level control.

Referring now to FIG. 4, there is shown a flyback converter circuit similar to the circuit of FIG. 1. Like integers of FIG. 4 to those of FIG. 1 are identified by like numerals.

A detailed explanation of the functioning of the circuit of FIG. 1, will not be given as the normal functioning of the FIG. 4 circuit is identical to the normal functioning of the FIG. 1 circuit. The difference between the flyback converters of FIG. 4 and that of FIG. 1 however resides in the fact that in the circuit of FIG. 4, the power control circuit 110' has been modified so as to provide two outputs, the first output being the "trip level" output already described in relation to FIG. 1, and the second output being a "timer level" output which will be described in due course.

The "timer level" of power control 110' is a signal which is fed to an input of LEB timer 150'. The detailed construction of power control 110' and LEB timer 150' will be described in due course.

It will be recalled from the discussion of the operation of the flyback converter of FIG. 1 that the blanking period of the prior art LEB timer 150 was a fixed blanking period determined by a time constant of the LEB timer. In the example discussed, that time constant was set by a capacitor $C_{TC}$. Whilst it would be possible to change the preset blanking time of the LEB timer 150, by varying the value of the capacitor $C_{TC}$, to change the rate at which the internal voltage of the LEB timer rises towards "timer level", automatic variation of a capacitance level is not readily achievable. Accordingly, in a first embodiment of the invention the power control 110' is adapted to provide a variable voltage output to specify the value of "timer level" within the LEB timer 150'.

The effect of providing the variable timer level and the flexibility which that gives to the arrangements of FIG. 4, will now be described with reference to the timing diagrams of FIGS. 5 and 6.

Figure 3:
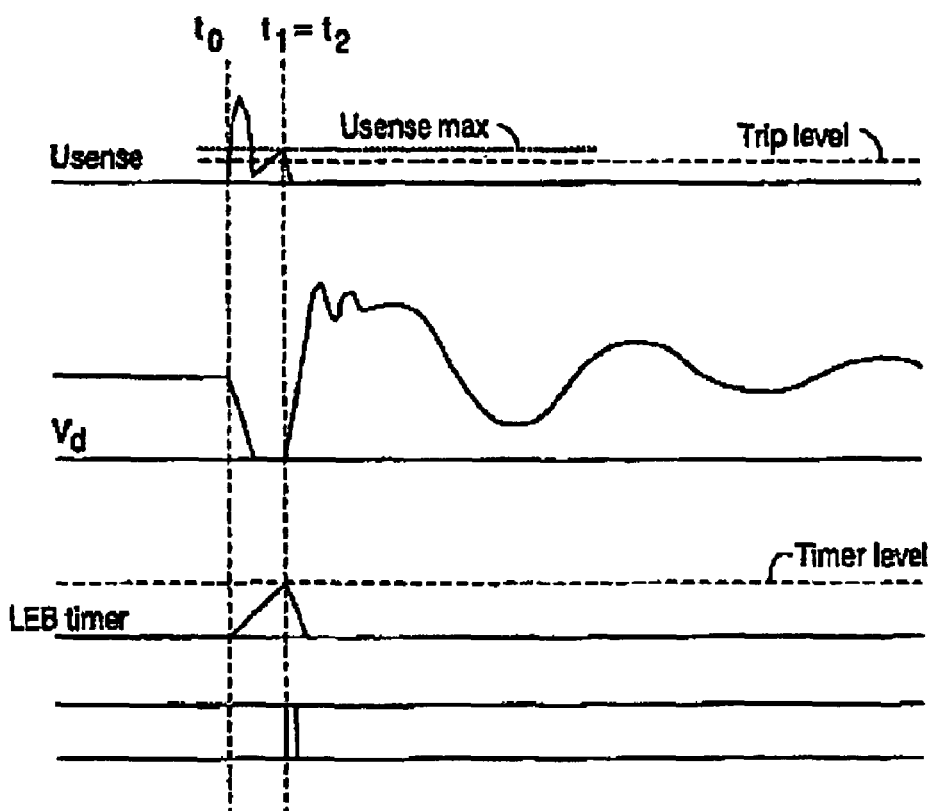
FIG. 3 shows timing diagrams for the flyback converter of FIG. 1 under minimal on-time operation conditions.
Figure 5:
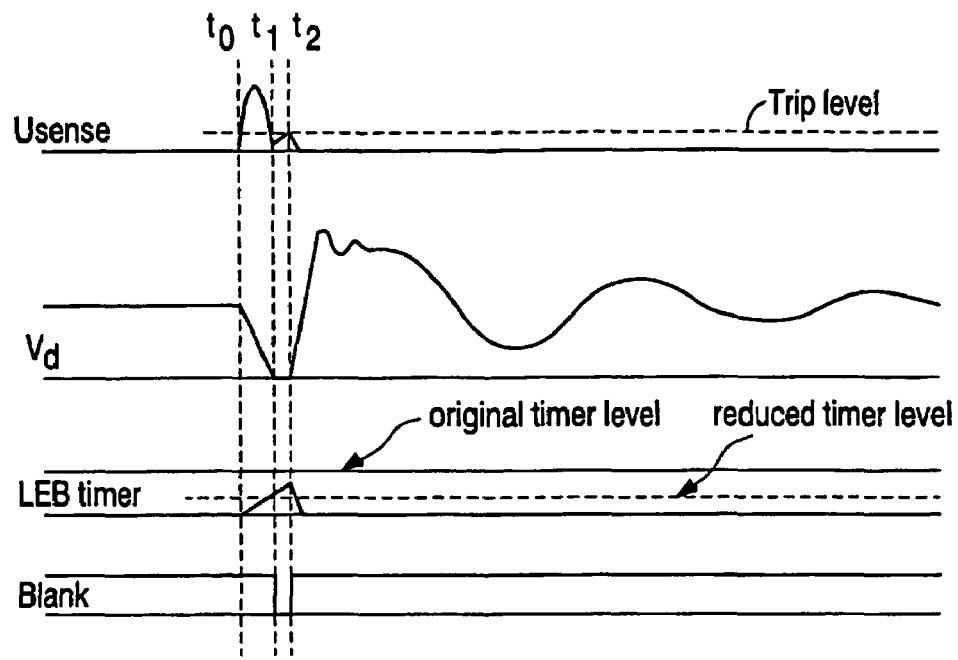
FIG. 5 is a timing diagram for the circuit of FIG. 4 showing low power operation.

Referring now to FIG. 5, the desired duty cycle and hence output switching modes of FIG. 5 are the same as those discussed, but not achievable, in the FIG. 3 situation. Here, power control 110 of the prior art arrangement set the "Trip level" according to output requirements, but the transistor switch S1 10 was not permitted to turn off at the point at which the "Trip level" was reached, as the blanking period was still persisting during that time. In the FIG. 5 arrangement, in contrast, the adapted power control 110' setting the reduced "Trip level" has necessitated setting a reduced "timer level" (original and reduced timer levels are shown in the third trace of FIG. 5). By setting the timer level to be lower, a comparator internal to the LEB timer recognises that the rise in voltage generated within the LEB timer 150' has reached the reduced timer level and, accordingly, sets the "Blank" output of the LEB timer low at that point, shown on the timing diagrams as time point $t_1$. Setting the output low at this point, allows the output of comparator C 130 to be accepted as a valid input at the logic circuit 140 and permits that effect to be passed through to the reset terminal of latch 170 to permit an early turnoff of transistor switch S1 10. Looking at FIG. 5 in detail, the initial turn on point of switch S1 and the point at which the internal voltage or the LEB timer starts to rise is $t_0$. Because of the low power operation mode, power control 110' sets the appropriate "Trip level" at which the switch S1 10 should ideally turn off as the low "Trip level" value shown in the first trace of FIG. 5 by the broken horizontal line and also sets (in a manner which will be described later) a "reduced timer level" lower than the fixed prior art timer level which is shown in FIG. 5 as "original timer level". When the internal voltage of the LEB timer reaches the "reduced timer level", a comparator or other suitable means within the LEB timer 150 switches the "Blank" output to end the blanking pulse and enable the latch 170 to respond to a change in state of the output of comparator 130 when this occurs at time point $t_2$ when $U_{SENSE}$ reaches the "Trip level" set by power control 110'.

Referring to the second voltage trace shown in FIG. 5, it can be seen that switch S1 10 becomes progressively switched on and, indeed, in the traces shown in FIG. 5, becomes fully turned on at the point at which the blank output switches state. It can therefore be seen that during such low power operation, the power control circuit 110' reduces "timer level" until the on-time of the switch S1 10 is small enough to match the power requirements on the output.

Figure 6:
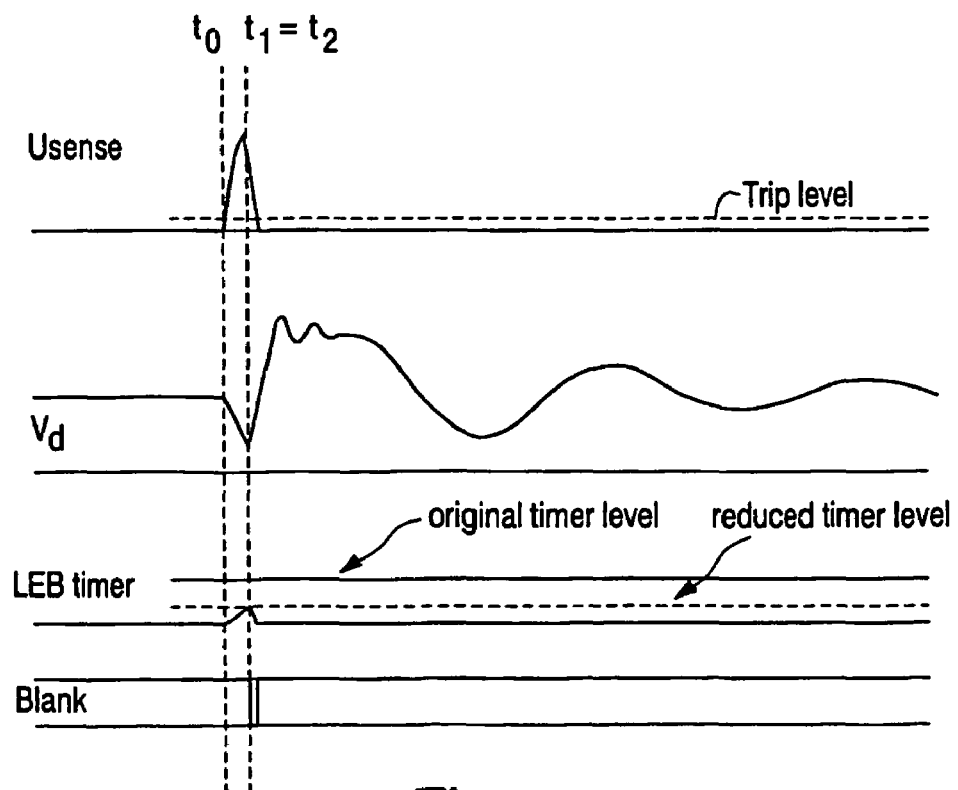
FIG. 6 is a timing diagram for the circuit of FIG. 4 showing very low power operation.

Referring now to FIG. 6, a very low power situation is shown. In this situation, for extremely low power operation the reduced timer level shown in the third trace of FIG. 6 is set so low that the internal voltage of the LEB timer reaches the reduced timer level while the transient switching pulse is still present and whilst the drain voltage $V_D$ shown in the second trace is still reducing toward ground level, indicating that transistor switch S1 10 is still in the process of turning on. In other words, the blanking period has been reduced to a period which is actually less than will in ordinary circumstances be considered adequate. Because the source current as indicated by level $U_{SENSE}$ is actually larger than the designated "Trip level" due to the capacitive peak during switch on, the transistor switch S1 10 is switched off immediately after the (reduced) LEB time. Instead of peak current control, the system is now actually in on-time control (also called voltage mode control). The on-time is controlled by the LEB time as the current comparator C 130 has a high output. For this switch over from current mode to on-time control no extra circuitry is needed.

From the above discussion, it can be seen that controlling LEB time to effectively control on-time of the transistor switch means that the minimum on-time can even be zero if the timer level is reduced to zero. The (pre-) load on the output can now be reduced to zero also as the power control circuit is able to reduce converted power to zero and this results in a lower standby power than in prior art current mode control systems.

The above has described in specific terms how a transistor switch S1 10 may have it's on-time varied by providing an appropriate control input to a modified LEB timer 150', with the reduced timer level being determined by a power control circuit 110'.

An example of the power control circuit 110' will now be described in relation to FIG. 7, and examples of appropriate LEB timers 150' will be discussed in relation to FIGS. 8 and 9.

Figure 7:
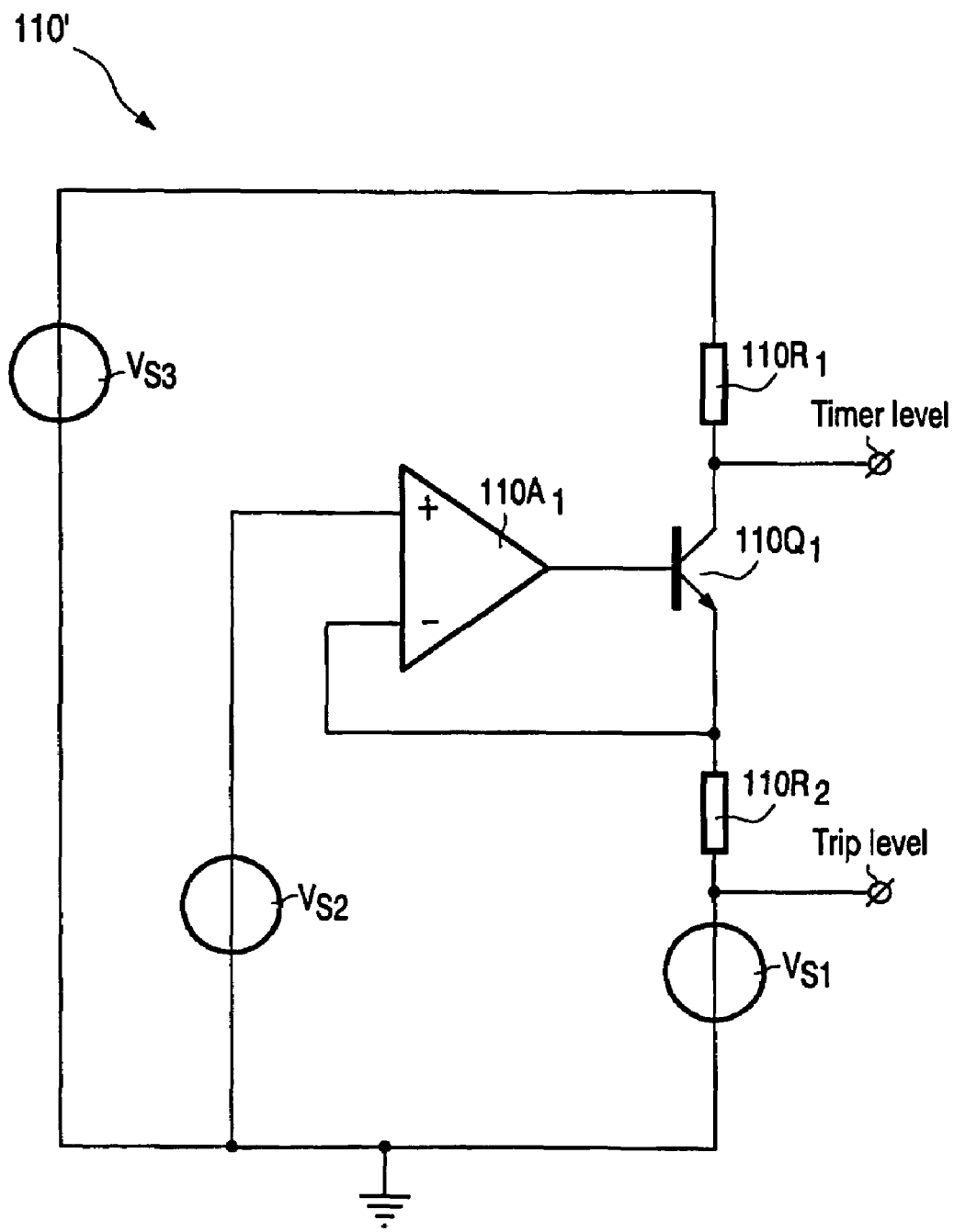
FIG. 7 is an example of a power control circuit with trip level control and LEB timer level control, suitable for use with the circuit of FIG. 4.

Referring now to FIG. 7, the structure of a modified power controller 110' is shown. The power controller includes three voltage sources $V_{S1}$, $V_{S2}$ and $V_{S3}$, a transistor 110Q$_1$ (here shown as a bipolar npn transistor, but could equally be of a MOSFET type), an amplifier 110A$_1$ and first and second bias resistors 110R$_1$, 110R$_2$. The first voltage source $V_{S1}$ is of a variable voltage and determines the "trip level" potential which is set in a conventional manner by the output power requirement of the secondary circuit being driven by the SMPS of which the flyback converter 100 forms a part. As can be seen from FIG. 7, first voltage source $V_{S1}$ is situated between ground and a first terminal of second bias resistor 110 R$_2$ and provides the power level control output "trip level". The second terminal of second bias resistor 110R$_2$ is connected to a third terminal, the emitter terminal, of transistor 110Q$_1$ and also to the inverting input of amplifier 110A$_1$. The non-inverting input of comparator 110A$_1$ is connected to the second voltage source $V_{S2}$, which is a voltage reference source, whilst the output of amplifier 110A$_1$ is connected to a first terminal, the base terminal, of transistor 110Q$_1$. A second terminal, the collector, of transistor 110Q$_1$ provides the output control signal "timer level", whilst first bias resistor 110R$_1$ has a first terminal connected to supply voltage $V_{S3}$, and a second terminal connected to the collector of transistor 110Q$_1$.

A rudimentary analysis of the circuit of FIG. 7 shows that the amplifier 110A$_1$ due to be connected with negative type feedback will opearte within a particular operating range so as to try and maintain the voltage on the inverting input terminal at the same level as the voltage on the non-inverting input terminal as supplied by voltage reference source $V_{S2}$. When the aforementioned condition is satisfied then the voltage across the second bias resistor 110R$_2$ will be $VS_2-VS_1$. The current IR$_2$ through the second bias resistor 110R$_2$ (referred to more simply hereinafter as R$_2$) is therefore $(VS_2-VS_1)/R_2$. Ignoring the small base current of transistor 110Q$_1$ the current IR$_1$ flowing through the first bias resistor 110R$_1$ (referred to more simply hereafter as R$_1$) will be also equal to the current through R$_2$. In this case, the control signal output "timer level" at the second output terminal of the power controller will have a voltage level given by: $V_{S3}-(IR_1 * R_1)=V_{S3}-(IR_2 * R_1)=V_{S3}-((V_{S2}-V_{S1})/R_2 * R_1)$.
This equation holds true as long as $V_{S1} < V_{S2}$. If, however, VS1>VS2 then "timer level" will assume a maximum level set by the supply voltage $V_{S3}$. With the above in mind, it can be seen that starting from a certain power level in the output circuit of the SMPS and reducing the power, "Trip Level" will reduce first, whilst "Timer Level" will remain at a constant maximum value set by $V_{S3}$, transistor 110Q1 being non-conducting, and that level is used during normal mode operation. It will further be appreciated that as $V_{S1}$ becomes smaller than $V_{S2}$, "timer level" will drop from the constant maximum potential of $V_{S3}$ down to a potential of $V_{S3}-((V_{S2}-V_{S1})/R2*R1)$ that is now a variable voltage varying in accordance with the varying power requirements of the output circuit of the SMPS as given by VS1.

Naturally, the voltage output from "timer level" will always be at a higher potential than the output "trip level" and with transistor 110Q$_1$, TIMER LEVEL=I.110R$_2$+V$_{CE}$+ TRIP LEVEL. For optimal regulation behaviour, transistor switch 110Q1 is arranged to turn on only when $V_{S1}$ (TRIP LEVEL) has reduced to a very low level. The point at which "TIMER LEVEL" is allowed to reduce from its normal level, denotes the point at which control changes from a current mode control to a voltage mode control and if "timer level" reduction is allowed to occur at higher "trip levels" then the transition between current mode and voltage mode control will be less smooth.

For completeness, whilst the generation of the Trip Level is quite conventional, a brief explanation of one means of obtaining such a Trip Level voltage as supplied by VS1 is given. VS1 may be created by sensing an output voltage on the secondary side of the SMPS using a potential dividing circuit and comparing that voltage to a fixed reference. The difference between the fixed reference and the sensed voltage is then amplified by an error-amplifier to provide a voltage (VS1) that varies in accordance with the power demands of the SMPS. It will be appreciated that in general terms VS1 can be generated by any appropriate method by measuring output voltage or current.

Referring now to FIGS. 8(a) and 8(b) a conventional LEB circuit 150 and a modified LEB circuit 150' will be discussed.

The conventional LEB circuit 150 shown in FIG. 8A comprises an input terminal for receiving a trigger signal indicating a time at which a blanking period should commence, switching means arranged to be activated by the trigger signal to change from a first state to a second state. It further comprises comparison means and a charging circuit. The comparison means has a first terminal connected to a reference source and a second input terminal arranged to receive a voltage which ramps over time in response to the trigger signal and an output terminal for providing an output signal of the leading edge blanking circuit which changes state subsequent to the voltage at the second terminal of the comparison means reaching the voltage level supplied by the reference source to the first terminal. The charging circuit provides the ramp voltage to the second input terminal of the comparison means.

In the embodiment of FIG. 8(A) the switching means comprises an inverter 150NOT and a transistor switch 150S2, the comparison means comprises a comparator 150C2, the reference source comprises a voltage source 150U1 and the charging circuit comprises timing capacitor 150C$_{TC}$ and a constant current source 150I1.

The inverter 150NOT is connected to a trigger input of the LEB circuit and provides a signal to the gate of switch 150S2. The drain and source of switch 150S2 are connected across the terminals of timing capacitor 150C$_{TC}$, with a positive terminal of the timing capacitor 150C$_{TC}$ and the drain of transistor 150S2 being commonly connected to the output of current source 150I1 and to the inverting input of comparator 150C2. The negative terminal of timing capacitor 150C$_{TC}$ and the source terminal of switch 150S2 are connected in common to a ground terminal voltage source 150U1 is connected between ground and the non-inverting input of comparator 150C2. Output of comparator 150C2 provides the output "blank" of the LEB timer 150.

It can be seen that when the input of inverter 150NOT is low, then the output of that inverter will be high and switch 150S2 will therefore be on. In such a condition, timing capacitor 150C$_{TC}$ is effectively shorted out and the inverting input of comparator 150C2 is in a low voltage condition in the steady state, with the output "blank" of comparator 150C2 being high. When however the input to inverter 150NOT goes high, the gate voltage at switch 150S2 goes low at time point T$_0$ shown in the first trace accompanying FIG. 8(a). Switch 150S2, being now open means that the current I1 provided by constant current source 150I1 is now used to charge timing capacitor 150C$_{TC}$ and, accordingly, the voltage at the inverting input of comparator 150C2 ramps upwardly and, when it reaches the voltage level defined by voltage source 150 U1 (=TIMER LEVEL) the output of comparator 150C2 will change state from a high steady state to a low state at t$_1$.

Referring now to the modified LEB timer 150' of FIG. 8(b), it can be seen that that timer is constituted by exactly the same circuitry elements and, where appropriate these elements are designated by equivalent references. Here, however, the time taken for the ramp voltage to reach the voltage level supplied by the reference source is variable and dependent upon a "timer level" signal supplied by an external power controller 110'.

The only alteration to the LEB circuit 150 to provide new circuit 150' is the fact that instead of the voltage level TIMER LEVEL being a fixed voltage given by a fixed reference 150U₁ the voltage reference source 150U₁ is eliminated or bypassed and, instead, the non-inverting input of comparator 150'C2 is arranged to receive the variable "timer level" signal from power control 110'. In this way, it will be appreciated that when the "timer level" supplied by the circuit of FIG. 7 is a reduced voltage level, then comparator 150'C2 will switch earlier according to that "reduced timer" level as has been previously discussed in relation to FIGS. 5 and 6. The difference in switching points between the reduced timer level and the original timer level is also shown graphically in traces associated with FIG. 8(b) to the right thereof.

FIG. 9 shows an alternative LEB circuit 150" which is arranged so as to use the "timer level" signal from power control 110' to provide a variation in charging current I1 to timing capacitor 150"C$_{TC}$ in order to change the rate at which the timing capacitor charges and hence the time taken for the voltage at the inverting input of the comparator 150"C2 to reach the reference voltage U1 changes. In this circuit therefore, rather than the voltage at which the comparator changes state being altered directly, the circuit of FIG. 9 instead adaptively changes the rate at which the capacitor of the charging circuit rises.

In general terms, the circuit of FIG. 9 like the circuit of FIG. 8(B) also includes the elements of an input terminal for receiving a trigger signal indicating a time at which a blanking period should commence, switching means arranged to be activated by the trigger signal to change from a first state to a second state. It further comprises comparison means and a changing circuit. The comparison means has a first terminal connected to a reference source and a second input terminal arranged to receive a voltage which ramps over time in response to the trigger signal and an output terminal for providing an output signal of the leading edge blanking circuit which changes state subsequent to the voltage at the second terminal of the comparison means reaching the voltage level supplied by the reference source to the first terminal. The charging circuit provides the ramp voltage to the second input terminal of the comparison means and the time taken for the ramp voltage to reach the voltage level supplied by the reference source is variable.

In more detail, the leading edge blanking circuit of FIG. 9 comprises a transistor switch composed of inverter 150"NOT and switch 150"S2, the comparison means comprises a comparator 150"C2 in which the first terminal comprises a non-inverting terminal connected to a fixed voltage reference source 150"U1 and the second input terminal comprises an inverting input and the charging circuit shown comprises a capacitor 150"C$_T$, transistor 150"T1 and a supply voltage 150"V$_{SUPPLY}$ and bias resistor 150"R1, the transistor 150"T1 works in linear mode to supply a variable charging current from the supply voltage 150"V$_{SUPPLY}$ dependent upon the potential of signal "timer level" which is supplied to the control terminal (here base) of the transistor 150"T1.

A rudimentary analysis of the circuit of FIG. 9 indicates that when "timer level" varies downwardly, transistor 150"T1 progressively turns on to allow charging current I1 to increase and to thereby increase the rate at which timing capacitor 150"C$_T$ charges towards voltage reference V$_{REF}$. In this way therefore the blanking period is reduced adaptively by bringing forward the transition point at which the output "blank" of comparator 150"C2 changes state. Here, the charging current supplied to the charging capacitor 150"Ct is given by the equation (V$_{supply}$-TIMER LEVEL-U$_{be}$)/R1, where V$_{supply}$ is the voltage of power supply 150"V$_{supply}$, U$_{be}$ is the base-emitter junction voltage of transistor 150"T1 and R1 is the resistance value of 150"R1.

From the above discussion of the invention, it will be appreciated that by simple changes to an existing LEB timing circuit, the blanking period which is conventionally a fixed period can be made adaptive according to the power requirements of a secondary side circuit of an SMPS. It will also be appreciated that by implementing the invention as discussed herein, the LEB time may be very closely controlled so as to even be able to reduce the LEB time to a period in which the transient peak of a main switching transistor is still present or, indeed to reduce LEB time to zero. By being able to reduce the blanking period to shorter time periods than previously possible, preloading of the output of an SMPS may be avoided and standby and low power operation requirements considerably reduced.

It will also be appreciated that although various specific circuit elements have been described, such elements may be substituted by equivalent items where appropriate. The word "comprising" does not exclude other elements or steps, and the words "a" or "an" do not exclude a plurality.

The invention claimed is:

1. A leading edge blanking circuit comprising:
   an input terminal for receiving a trigger signal indicating a time at which a blanking period should commence;
   switching means arranged to be activated by the trigger signal to change from a first state to a second state;
   comparison means having a first input terminal being connected to a reference source, a second input terminal arranged to receive a voltage which ramps over time in response to the trigger signal and an output terminal for providing an output signal of the leading edge blanking circuit which changes state subsequent to the voltage at the second terminal of the comparison means reaching the voltage level supplied by the reference source to the first terminal; and
   a charging circuit for providing the ramp voltage to the second input terminal of the comparison means,
   the circuit being characterised in that the time taken for the ramp voltage to reach the voltage level supplied by the reference source is deliberately adjusted as a function of a control signal received at a control input of the circuit.

2. The leading edge blanking circuit of claim 1, wherein the reference voltage supplied to the first terminal of the comparison means comprises the control signal.

3. The leading edge blanking circuit of claim 2, wherein the charging circuit comprises a current source and a capacitor, the current source being arranged to charge the capacitor following an initiation of change in state of the switching means from the first state to the second state and, wherein, the voltage supplied to the second input terminal of the comparison means is arranged to ramp in accordance with a charged state of the capacitor.

4. The leading edge blanking circuit of claim 1, wherein the switching means comprises a transistor switch, the charging circuit comprises a capacitor connected in parallel with the transistor switch and a current source arranged to charge the capacitor when the transistor switch is not in the first state, the comparison means comprises a comparator, wherein the first terminal is a non-inverting input and the second terminal is an inverting input, the first terminal being connected to the control signal and the second terminal being connected to a terminal of the charging circuit at a point between the current source and the capacitor.

5. The leading edge blanking circuit of claim 1, wherein the reference voltage supplied to the first terminal of the comparison means is a fixed voltage reference source and, wherein, the control signal is arranged to vary a current level in the charging circuit, to change the rate at which the voltage at the second input terminal of the comparison means ramps over time.

6. The leading edge blanking circuit of claim 5, wherein the charging circuit comprises a voltage source, a transistor and a capacitor, the transistor being responsive to the voltage source and the control signal to turn on and to supply a charging current to the capacitor.

7. The leading edge blanking circuit of claim 6, wherein the charging current to the capacitor is a variable current, dependent upon a potential difference between the voltage source and the control signal.

8. The leading edge blanking circuit of claim 1, wherein:
the first switching means comprises a transistor switch;
the comparison means comprises a comparator in which the first terminal comprises a non-inverting terminal connected to a fixed voltage reference source, and the second input terminal comprises an inverting input; and
the charging circuit comprises a capacitor, transistor and a voltage source, the capacitor being connected in parallel with the first switching means and having one terminal thereof connected in common to the inverting input of the comparator and an output terminal of the transistor, the transistor being arranged to supply a variable current from the voltage source dependent upon a voltage level of the control signal supplied to its control input.

9. A power controller for a switched mode power supply for supplying a control signal to a leading edge blanking circuit of claim 1, the power controller being arranged to output the control signal at a substantially constant level during a first operating power range of the SMPS and, in a second operating power range to progressively decrease the level of the control signal as the output power requirements of the SMPS decrease.

10. A power controller according to claim 9, wherein the first range of operating power range comprises a normal operating power range of the SMPS being controlled, and the second range comprises a low power to very low power operating range.

11. A power controller according to claim 9, wherein the power controller comprises an amplifier, a transistor, a supply voltage, a variable voltage source whose voltage depends upon the power output requirements of the SMPS, a voltage reference source, and a control output terminal for supplying the control signal "Timer Level", the control output terminal being connected to the supply voltage via a first biasing means and to one terminal of the transistor, the voltage reference source being connected to a non-inverting input of the amplifier, an inverting input of the amplifier being connected via second biasing means to the variable voltage source and directly to another terminal of the transistor, and an output of the amplifier being arranged to operate and progressively increase a control current input to the transistor so as to progressively turn on the transistor during the second operating range and being further arranged to turn off the transistor during the first, normal, operating range, wherein when the transistor is turned off, the voltage of the Timer Level control signal is at a maximum constant value and, when the transistor is in a linearly operating state the voltage of the Timer Level control signal is arranged to decrease as the transistor progressively turns on.

12. A power controller as claimed in claim 9, wherein the power controller comprises an amplifier, a transistor, a supply voltage, a voltage reference source, a variable voltage source whose voltage level is dependent upon the output power requirements of the SMPS and first and second bias resistors, wherein: the
voltage reference source is connected between a lower rail voltage and a non-inverting input of the amplifier, the power supply is connected between the lower rail voltage and a first terminal of the first bias resistor to provide an upper rail voltage thereto, the variable voltage source is connected between the lower rail voltage and a common connection between a first terminal of the second bias resistor and a first output terminal of the power controller to provide a power level control signal "Trip Level" to the said first output terminal, an inverting input of the amplifier is commonly connected to a second terminal of the second bias resistor and a third terminal of the transistor, an output terminal of the amplifier is connected to a first terminal of the transistor and wherein a second terminal of the transistor is connected in common to a second output terminal of the power controller and a second terminal of the first bias resistor and to provide the control signal "Timer Level" to the said second output terminal.

13. A switch mode power supply including a flyback converter comprising a power controller arranged to set a desired power output of the SMPS by generating a control signal "trip level" at which the SMPS is to revert from an on-power state to an off-power state, a switch controller for controlling a main switching component of the SMPS in accordance with the power requirements as set by the "trip level" signal and a leading edge blanking circuit for providing an output signal "blank" arranged to validate or inhibit resetting of the switch controller, wherein the leading edge blanking circuit comprises a leading edge blanking circuit according to claim 1.

14. An SMPS according to claim 13, wherein the power controller is arranged to supply the "timer level" signal to the leading edge blanking circuit such that at trip levels above a particular threshold, the "timer level" is a substantially constant voltage regardless of the actual "trip level" and that the "timer level" is arranged to decrease once the "trip level" decreases below the threshold level.

15. A method of controlling a leading edge blanking circuit of the type in which, conventionally, a leading edge blanking time is fixed, the method comprising, during a normal power operating range of a switch mode power supply of which the leading edge blanking circuit forms a part, providing a substantially constant reference voltage to a voltage controlled switch of the leading edge blanking circuit so as to maintain the leading edge blanking period to be of a constant time period and being characterised in that, in a low to very low operating power range of the SMPS, a reduced level reference voltage is provided to the voltage controlled switch of the leading edge blanking circuit to adaptively reduce the leading edge blanking period.

* * * * *